(12) United States Patent
Freedman

(10) Patent No.: US 6,338,253 B1
(45) Date of Patent: Jan. 15, 2002

(54) METHOD AND APPARATUS FOR STORING AND SUPPLYING FUEL TO LASER GENERATORS

(75) Inventor: Benzion Freedman, D.N. Hamovil (IL)

(73) Assignee: Rafael-Armament Development Authority, Ltd., Haifa (IL)

(*) Notice: Subject to any disclaimer, the term of this patent is extended or adjusted under 35 U.S.C. 154(b) by 0 days.

(21) Appl. No.: 09/595,652

(22) Filed: Jun. 16, 2000

(30) Foreign Application Priority Data

Jun. 17, 1999 (IL) ................................................ 130541

(51) Int. Cl.$^7$ ............................... F17C 7/04; F17C 9/02
(52) U.S. Cl. ......................................... 62/48.1; 62/50.2
(58) Field of Search ................................. 62/50.3, 50.1, 62/50.2, 54.1, 48.1, 48.4

(56) References Cited

U.S. PATENT DOCUMENTS

| | | | | |
|---|---|---|---|---|
| 3,827,246 A | * | 8/1974 | Moen et al. ................. | 62/48.1 |
| 4,149,388 A | * | 4/1979 | Schneider et al. ........... | 62/50.3 |
| 4,961,325 A | * | 10/1990 | Halvorson et al. ........... | 62/48.1 |
| 5,373,700 A | * | 12/1994 | McIntosh ..................... | 62/48.1 |
| 5,540,208 A | * | 7/1996 | Kikutani ..................... | 123/518 |
| 6,023,933 A | * | 2/2000 | Langan et al. ................ | 60/50.2 |

* cited by examiner

Primary Examiner—William Doerrler
(74) Attorney, Agent, or Firm—Merchant & Gould P.C.

(57) ABSTRACT

Method and apparatus for the storage and delivery of process gases to laser generators. The process gas is cooled to a few degrees K, at the required work pressure, to reach a desired density, in the order of hundreds of kg/m$^3$. The cooled gas is then stored in a cryogenic environment at the work pressure. At the moment of use, the process gas is gradually released from the cryogenic environment and concurrently heated. the process gas flow rate from the cryogenic environment is controlled, so as to obtain the required work flow rate. The heat supplied to the gas is controlled, so as to maintain it constantly at the required work pressure. The heating of the process gas may be controlled synchronically with the flow rate of its release from the cryogenic environment to maintain the pressure substantially at its work value.

28 Claims, 2 Drawing Sheets

METHOD AND APPARATUS FOR STORING AND SUPPLYING FUEL TO LASER GENERATORS

FIELD OF THE INVENTION

This invention relates to a method and apparatus for storing and supplying fuel to chemical laser generators, more specifically, it relates to a cryogenic fuel supply system, particularly adapted for movable laser installations, which permits to store high quantities of gas required by the laser in containers having reduced volume and weight.

BACKGROUND OF THE INVENTION

Chemical laser generators require for their operation large quantities of a gas (which will be called hereinafter "process gas", for the sake of clarity), such as helium, which must be supplied at a temperature that is generally about normal ambient temperature, e.g. about 300 K (but also may have to be supplied at different, in particular lower, temperatures), and at medium pressure, e.g. in the order of 50 ata. However, the required large amounts of process gas create storage problems, particularly in mobile laser systems. To store the required quantities in containers of acceptable volume, the gas should be compressed to a relatively high density, e.g., in the order of hundreds of kilograms per cubic meter (e.g. 200 $Kg/m^3$). Achieving such a density at normal ambient temperature requires that the gas be compressed to extremely high pressures, about 1500 ata, and correspondingly, storage containers are required which have thick walls. Containers of the required large size and with such thick walls, would have weights of several tons or even tens of tons, and making them would pose an engineering problem. Also, the compression of ethylene and $NF_3$ is not practical nor cost effective, since the compression of $NF_3$ creates safety problems and ethylene condenses during expansion to working pressures but these gases are used in smaller amounts than helium.

Further, helium, which is prevalently used as a process gas, and other process gases, must be supplied to the laser apparatus, when this latter is operated, under critically defined supply rate and pressure. Additionally, with present day technology, the temperature must not be lower than a certain limit. The required operating or work pressure is much lower than that required to compress helium to the desired density (e.g. it may be about 80 ata), and the expansion of helium from, e.g., 1500 ata to 80 ata would cause a drop of temperature to far below the acceptable laser operating pressure.

The laser generator, in all its parts, must be capable of being switched on, and therefore brought to the required operating or work conditions, in a very short time, not more than one half of a second. This fact creates engineering problems that do not exist in apparatus that works continuously or for which long switch-on times are acceptable. Therefore the process gas, no matter how it is stored, must be made available in the required work conditions in half a second or less.

It is therefore a purpose of this invention to provide an apparatus for supplying process gas to laser generators, which includes a system for storing the process gas comprising storage tanks the volume and the weight of which is greatly decreased, with respect to those of the prior art.

It is another purpose to provide such an apparatus in which the volume and the weight of the storage tanks for the process gases is smaller by at least an order of magnitude than in the storage systems of the prior art.

It is a further purpose to provide such an apparatus that supplies the process gas to the laser generator at the desired work conditions, particularly at the desired pressure and temperature.

It is a still further purpose to provide such an apparatus that permits the laser generator to be switched on in no more than one half of a second.

It is a still further purpose of this invention to provide such an apparatus, having the aforesaid advantages, and which can be applied to store helium, ethylene, $NF_3$ and $D_2$.

It is a still further purpose of this invention to provide such an apparatus which is suitable for movable installations.

It is a still further purpose of this invention to provide such an apparatus which does not require the compression of the process gas to the operating pressure.

It is a still further purpose of this invention to provide such an apparatus wherein the gas is stored in supercritical condition, at a density greater than that of the corresponding liquid.

It is a still further purpose of this invention to provide such an apparatus which is particularly suitable for the storage and rapid supply of a gas, e.g. such as DF Chemical Lasers or COIL in Airborne Laser.

It is a still further purpose of this invention to provide a process whereby process gases can be stored in a relatively small volume.

It is a still further purpose of this invention to provide a process for supplying process gases to the laser generator at the work temperature and pressure and at the required rate.

It is a still further purpose of this invention to provide such a process whereby the laser generator can be switched on in no more than one half of a second.

Other purposes and advantages of the invention will appear as the description proceeds.

SUMMARY OF THE INVENTION

The method, according to the invention, for the storage and delivery of process gases to the laser generator comprises the following steps:

a) cooling the process gas to a few degrees K, at the required work pressure, for example, to about 4 K at 80 ata, to reach a desired density, which is preferably in the order of hundreds of $kg/m^3$;

b) storing the cooled gas in a cryogenic environment at said work pressure;

c) at the moment of use, gradually releasing the process gas from the cryogenic environment and concurrently heating it, d) controlling the process gas flow rate from the cryogenic environment so as to obtain the required work flow rate; and e) controlling the heat supplied to the gas so as to maintain it constantly at the required work pressure.

In an embodiment of the invention, the heating of the gas takes place preferably partly in the cryogenic space and partly outside it. The heating within the cryogenic space controls the gas flow rate and the heating outside it brings it substantially at the required work temperature. The word "substantially" is used in this specification and claims to indicate that two temperatures do not differ from one another by more than 50° C. If the temperature is considered not critical, at least within certain limits, is not critical, the second mentioned heating can, in some embodiments, be omitted. As the gas is released from the cryogenic space, its density decreases and its pressure would decrease, if its temperature remained constant. The pressure remains constant because the gas is heated, and therefore heating and release of the gas must be synchronically controlled so that their contrary influences on the pressure balance each other.

The heat for heating the process gas is preferably supplied to the heat exchangers by means of a heating gas. To achieve the aforesaid synchronic control of the heating and the release of the process gas, and in view of the fast response required from the system to provide a short switch-on time, the invention comprises carrying out the heat exchange between the process gas and the heating gas in a very rapid manner. From the apparatus viewpoint, this requires providing heat exchangers having small, ideally negligible, thermal mass, so as to accelerate the heat exchange and to allow fast response of the system. On the other hand, since such heat exchangers must have thin walls, they cannot withstand considerable pressure, and therefore the invention comprises feeding the heating gas at a pressure close to the work pressure of the process gas, e.g. about 80 ata.

To carry out the invention in said preferred way, the heating gas can be generated in various ways. It can result from the catalytic, exothermic decomposition of a solid or liquid substance, particularly, in a preferred embodiment, hydrogen peroxide, which produces $H_2O$ and $O_2$, and, because of the decomposition heat, a mixture of steam and oxygen at elevated temperature, e.g. about 300° C. Such a mixture can be used as a heating gas, but, in a preferred embodiment, the further heat is generated by the combustion of a fuel with the oxygen generated by the said decomposition. Substantially the same pressure as the work pressure of the process gas is maintained in all the stages of the production and use of the heating gas. By "substantially the same pressure as the work pressure" is meant in this description and claims a pressure that differs from the work pressure by no more than ±10 ata. Said pressure may be created by means of the process gas, as will be explained hereinafter.

The apparatus according to the invention comprises:

I)—a cryogenic storage tank for storing process gas at cryogenic temperatures and at work pressure, e.g. 80–85 ata;

II—means for feeding process gas to said tank at said temperature and pressure;

III—conduit means for releasing said process gas from said tank and delivering it to the laser generator; and IV—heating means for heating said process gas as it is released, whereby to control its flow rate, pressure and temperature as required for the operation of the laser generator V—a flow valve for controlling the timing and the flow of the process gas to the laser generator; and VI—optionally, a cryogenic refrigerator for keeping the stored gas at the desired cryogenic storage temperature.

Preferably, said heating means comprise:

a) a heating gas generator apparatus;

b) heat exchanger means, having low thermal mass, for causing fast heat transfer from said heating gas to the process gas as this latter is released from the cryogenic storage tank; and c) pressurizing means for applying to said heating gas the same pressure as that of the process gas.

More preferably, the heat exchanger means comprise:

d) a first heat exchanger, comprising a conduit for causing the heating gas to flow through said cryogenic storage tank; and e) a second heat exchanger between said cryogenic storage tank and the laser generator;

In a preferred embodiment of the invention, the heating(g gas generator apparatus comprises:

f) a liquid oxidant supply vessel;

g) a primary gas generator vessel comprising a catalyzer bed for generating a gaseous mixture from the decomposition of said liquid oxidant; and h) a fuel supply.

In said embodiment, the means for applying to the heating gas the same pressure as that of the process gas may consist in leading a part of the process gas to the liquid oxidant supply vessel, optionally through a pump for compensating pressure losses, to deliver the liquid oxidant to the gas generator and maintain, throughout the heating gas generator apparatus and the heat exchange means, a pressure substantially equal to the work pressure of the process gas, e.g. about 80 ata.

When a single heat exchanger or a first and a second heat exchanger are provided, the single or first one is preferably constituted by the cryogenic storage tank and by a pipe system contained within it, immersed in the cryogenic gas, and through which the heating gas flows, and will be called hereinafter "inner heat exchanger". By the expression "cryogenic gas" is meant herein a process gas kept at cryogenic temperatures. The second heat exchanger, when present, is constituted by a vessel through which the heating gas flows and which contains a pipe system through which flows the process gas issuing from the cryogenic storage tank.

The heating gas issuing from the heat exchange means may be directly ejected through a separate ejector, or be utilized as part of the first or ejecting stream in the main ejector that is always present in laser generator apparatus. The apparatus of the invention further may comprise an auxiliary container for containing sufficient process gas for switching on and operating the laser until the process gas from the cryogenic storage tank becomes available at the appropriate temperature and pressure.

DETAILED DESCRIPTION OF PREFERRED EMBODIMENTS

The types of laser generators to which this invention may be applied for providing the process gas may be, for example, but not exclusively, COIL, Chemical Pulsed Laser, Continuous Wave HF, DF, HBr, etc. It is also applicable to other compact gas feed systems, e.g. in rockets or airborne systems. The process gases, viz. the gases that are required for the operation of the laser generator, may comprise, as has been stated hereinbefore, helium, $D_2$, $NF_3$, and ethylene, as well as other gases. This description will be made with particular reference to helium, but the invention is applicable to any process gas, and in fact, this general applicability is one of its important features.

An embodiment of an apparatus according to the invention will now be described.

Numeral 10 indicates a laser generator. Numeral 11 indicates a fire valve, the purpose of which is to control the timing of the supply of the process gas to the laser generator, and which, at the same time, has the function of shutting off the storage system when no supply of process gas is required. Numeral 12 generally indicates a cryogenic storage tank which contains a pipe system 14, and which is immersed in the process gas and in contact with it, and which has a low thermal mass, viz. thin walls, to permit fast heat exchange. The storage tank 12 preferably has double walls for pressure and thermal insulation. Numeral 13 generally designates a fast heat exchanger, which consists in a vessel 13', which contains a pipe conduit 15, through which the process gas flows and around which, as will be explained, the heating gas flows. A small cryogenic generator, 16 in FIG. 1, is optionally provided and used to maintain the cryogenic gas at the desired temperature and compensate for heat losses from the storage tank.

Figure 1:
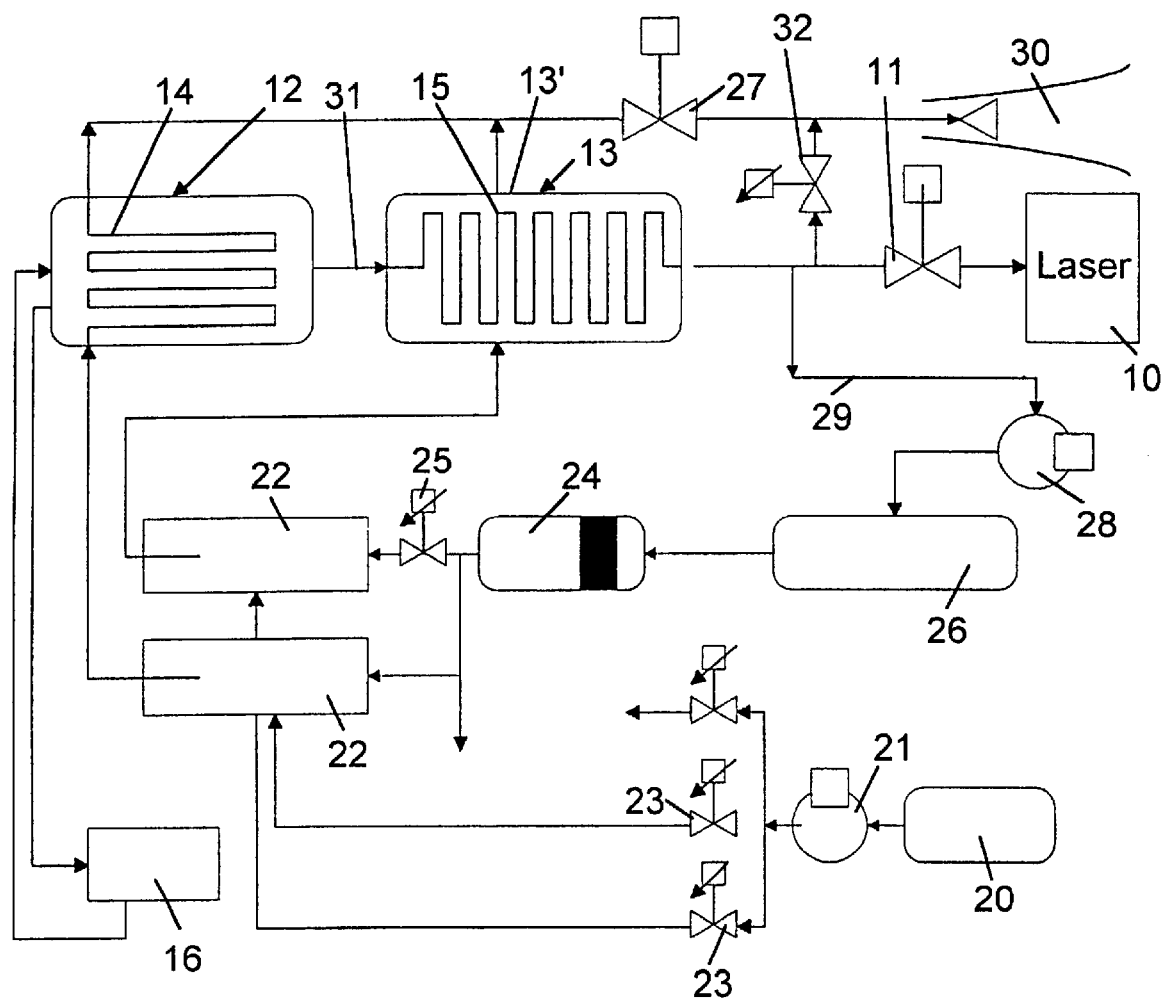
FIG. 1 is a schematic illustration of an apparatus according to an embodiment of the invention.
Figure 2:
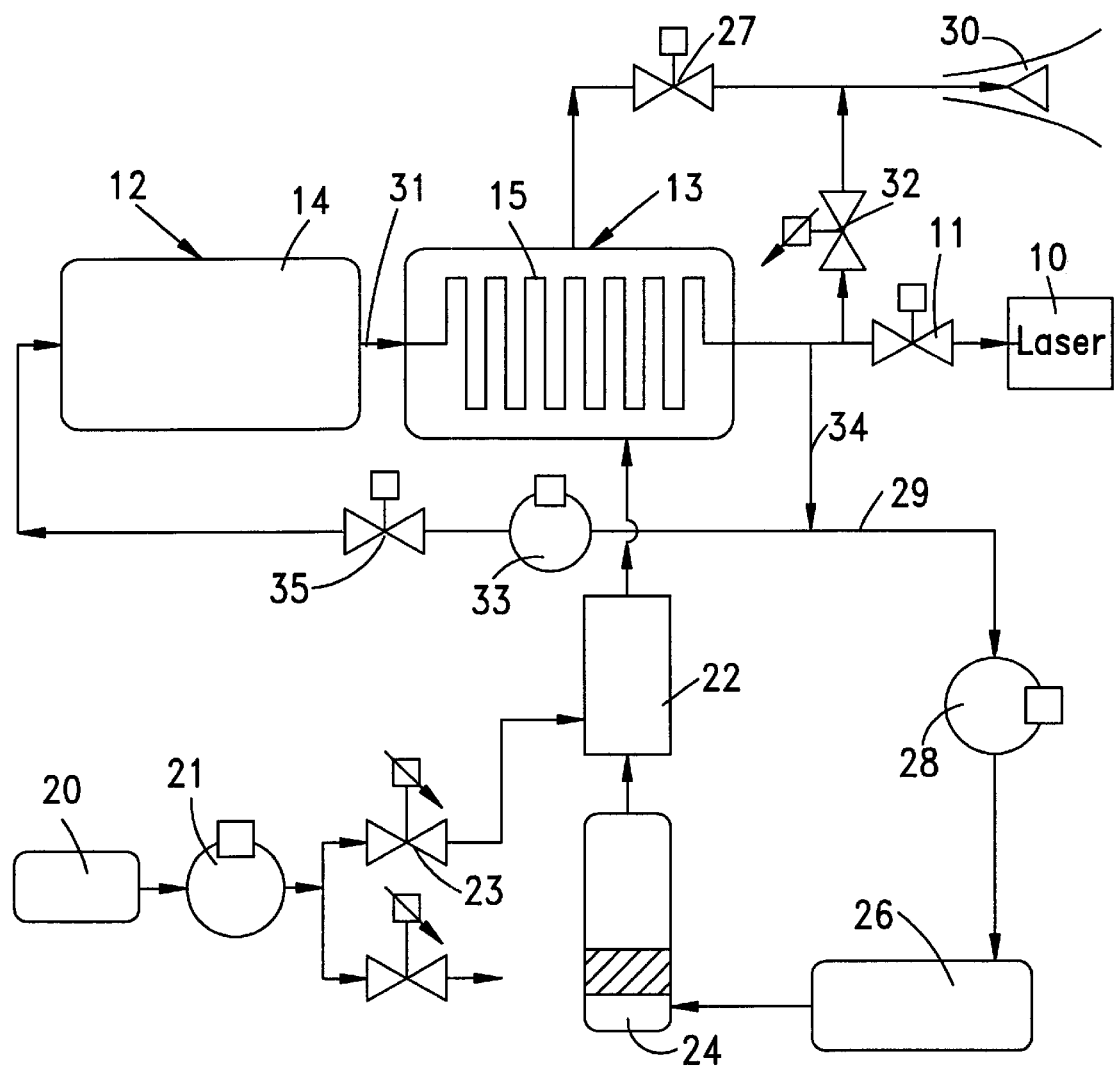
FIG. 2 is a schematic illustration of an apparatus according to another embodiment of the invention.

An alternative embodiment is illustrated in FIG. 2, in which the elements that are the same as in FIG. 1 are indicated by the same numerals. In this embodiment, pipe system 14 is lacking and no heat exchange takes place in the cryogenic storage tank. Part of the helium, which has been heated in fast heat exchanger 13, is fed back to the cryogenic storage tank 12 through a pipe 34, a pump 33 and a valve 35.

Preferably, the pipe system 14 (when present) and the pipe conduit 15 have a very low thermal mass. The pipes in the said exchangers have walls that are very thin, preferably about 0.1 mm, to minimize thermal mass and to allow fast response. Therefore, the pressure on both sides of the pipes must be substantially the same. As an example, the external heat exchangers may be built from two concentric tubes, the outer one being a pressure tube and the inner one being a very thin walled tube. They may include one-way mechanism to allow pressure equalization by the flow of helium to the gas generator gas. A safety valve may be provided to release pressure in the inner tube, if the helium pressure should exceed a predetermined limit, by allowing part of the helium to drain into the outer tube, whereby to prevent failure of the thin inner tube. In any case, care should be taken in the design of the device to prevent any situation in which steam might seep into the helium. However, other ways of building a fast heat exchanger can be adopted by skilled persons without exceeding the scope of the invention.

The means for producing and feeding to the heat exchangers the heating gases, in this embodiment of the invention, comprise a fuel tank 20, a pump 21 which feeds the fuel from said tank to the burners—only two of which are shown and indicated by numeral 22 in FIG. 1, and only one in FIG. 2, but which may be in a larger number fuel valves 23, and a vessel 24 from which, optionally through a valve 25 (see FIG. 1), an oxidant is fed to the burner to cause the burning of the fuel. In FIGS. 1 and 2, a way of supplying an oxidant gas to the burners is illustrated, but it is not the only possible one, as will be explained. In this particular way, hydrogen peroxide is contained in a vessel 26, and is fed to vessel 24. This latter contains a catalyzer, which decomposes the hydrogen peroxide into oxygen and water, and therefore, in this case, vessel 24 is a gas generator. However, alternatively. hydrogen peroxide may be fed directly to the burners and decompose and react with the fuel without having undergone catalytic decomposition, or an oxidant gas, such as cryogenic oxygen or $NF_3$, may be contained in vessel 24, which, in these cases, will be an oxidant storage vessel. The whole apparatus is designed for sufficiently quick reaction and for operation at the appropriate pressure.

In the embodiments illustrated, a liquid oxidant must be fed to vessel 24, and it can be fed in various ways. Thus, pressurizing gas may be stored in a high pressure vessel and be fed to vessel 26, which contains liquid oxidant, preferably hydrogen peroxide, through a pressure regulator to drive the liquid oxidant to vessel 24. Preferably, the pressurizing gas is part of the process gas, derived from the line leading it to the laser through a conduit indicated at 29, and a pressure booster pump 28, which increases its pressure, e.g., from 80 to 85 ata, to compensate for pressure losses in the cycle. In an alternative embodiment, not illustrated, a high pressure pump can be used to supply the oxidant liquid at the working pressure to gas generator vessel 24, e.g., at 80 ata. In a stand-by mode, the pump may operate on dummy circle (not shown in the drawing) and on fire command a valve will then direct the flow to gas supply vessel 24, in order to allow fast response. The booster 28 can be used in delivering pressurizing gas, e.g. Helium, to drive the liquid oxidant to vessel 24, at a sufficient pressure to overcome pressure falls, and can be in operation all the time, or be activated at each laser pulse generation. A small pilot pressure vessel can be used for starting. This pilot can be part of the volume of vessel 26. The vessel has fire valve and check valve (not shown) at its inlet and outlet respectively, to keep it pressurized above cycle pressure. The additional pressure is needed only to overcome pressure drop until the booster starts. Alternatively, it is possible to operate the booster continuously with no flow, and then there is no need to pilot volume or check valve.

A preferred way of equalizing the pressures in the apparatus embodiment described is based on the fact that the pressure of the process gas, e.g. helium, generates substantially the same pressure in the liquid oxidant vessel 26, and this pressure, moderately boosted by pump 28, is transmitted to oxidant vessel or gas generator 24, and therefore to the burners and, with a small pressure loss corresponding to the pressure boost provided by pump 28, to the conduits leading the heating gas to the heat exchangers.

While a pilot container containing enough gas at the right pressure can start the process until enough cryogenic gas is available, it is not illustrated in the drawing, as it is optional and it would be obvious how to connect it. The volume of the piping may be sufficient to act as a starting gas container, if a fast response of the fast heat exchanger is achieved, e.g., one to one-half of a second.

The cryogenic storage tank which, as has been said, contains, in the case of helium the same at approximately 4 K and 80 ata with the resulting density of 200 kg/m$^3$, needs a fast heat exchanger with very low thermal mass. It may contain more than one kind of process gas in the same volume, the different kinds being separated in different tubes exposed to the same heat source, or may even contain a mixture of process gases. When the storage tank is empty, it still contains unusable gas at working pressure and temperature. Alternatively, the empty tank may be kept at low temperature, which leaves more unused gas, but may be beneficial for refilling the tank with a less extreme refrigeration.

The apparatus according to the invention also comprises a flow control system, not illustrated, which controls the mass flow rate and the pressure of the oxidant gas from vessel 24, and also therefore controls the delivery of process gas to the laser. The combustion gases from the burners going into the storage tank 12 controls the pressure of the process gas, and those going into the fast heat exchanger 13 control the process gas temperature. Heat exchanger 13 is connected through fire valve 27 to ejector 30. The required heat flux ratio into the storage tank 12 is inversely proportional to the density of the gas in the tank, but for the heat exchanger 13 it is at a maximum at full tank, but is almost zero at empty tank. The heat flux can be controlled by controlling the total mass flow rate of the combustion gases, or by controlling heat through fuel flow rate, or by both methods. The control may be carried out in a closed loop system. It may be separated into a control for the storage tank 12 and a control for the fast heat exchanger, or a single control can be used and switched between the storage tank and the fast heat exchanger.

A sonic nozzle may be used to separate laser pressure fluctuations from the storage system of this invention.

The filling of the cryogenic storage tank can be done by a special high pressure refrigerator or by blow-down process from pressurized helium tank and through a liquid helium heat exchanger; or, optionally, may start with prefilling the cryogenic storage tank with liquid at low pressure. The blow down process can be started from liquid helium at a special helium tank that is pressurized by heating it at constant volume and then cooling the high pressure helium at constant pressure with heat exchanger before entering it into the cryogenic storage tank.

The operation of the apparatus described in FIG. 1 is as follows. On fire command, the fire valves 11, 23 and 27 are opened and the booster 28 starts to drive Helium, which may be, e.g., at 80 ata, through conduit 29 into the peroxide tank, which may be, e.g., at a pressure of 83 ata. This drives the hydrogen peroxide into gas generator vessel 24 and therefore into contact with the catalyzer. In the catalyzer, the peroxide is converted into a steam and oxygen mixture, the mixture is split into several streams and is directed to burners, of which only two are shown and indicated by 22. In the burners, the mixture is ignited with ethylene or other fuel, with the help of a spark igniter. The flow rate of the fuel, and therefore the heat supplied by the burners to the heating gas, is controlled by valves 23. The amount of heat transmitted by the heating gas to the cryogenic process gas through heat exchanger 14 controls the rate at which the process gas is released from the cryogenic storage tank and supplied to the laser generator. The valve 25 in turn controls the flow rate of the oxidant or oxidant mixture from vessel 24 to the burners. The hot combustion gases, now at 81 ata, flow from each burner 22 into the cryogenic storage tank 12 and into the fast heat exchanger 13. In the storage tank 12, the combustion gases flow through the inner tubing 14 and therefrom, through fire valve 27, to ejector 30. If desired, instead of directly ejecting said gases, they may be supplied to the main ejector (not shown) as part of the primary or ejecting gas stream. In the cryogenic tank 12, the helium, which is at 80 ata, is heated and expanded and flows from storage tank 12 to the tubing 15 of the fast heat exchanger 13, through the conduit indicated at 31, and therefrom, through fire valve 11, to laser generator 10. The pressure in tank 12 is kept constant, while the temperature of the process gas rises as its density falls down in the process of its release from said tank. The process is controlled by closed loop control on the fuel flow rate to the appropriate burner by means of valves 23. In this way the temperature, and therefore the heat flux at the internal heat exchanger of tank 12, is determined. In the fast heat exchanger 13, the helium from storage tank 12 is heated at constant pressure until it reaches 300 K, which is the laser working temperature. From there it flows to the laser. A valve 32 is provided to effect fine adjustments of the mass flow rate of the process gas by bleeding some of it as needed.

The initial pressure in vessels 12 and 13 and in the piping up to fire valve 11, is higher than 80 ata and it starts to fall when the fire valve is opened. It rises again when the process gas temperature in tank 12 starts to rise, and then it is kept constant during the laser operation. As the laser shuts down when the fire valve is closed, the pressure increases until the heat transfer at tank 12 ends.

In an alternative embodiment of the invention, the heating gas generator system is a monopropellant system, viz. the heating gas can be obtained without using burners, since the gas issuing from gas generator 24 can be hot enough, due to decomposition heat, to serve as heating gas. This alternative however requires a larger amount of heating gas and in this respect is less efficient.

In a further alternative embodiment of the invention, the heat needed to keep the storage tank pressure while it is emptied and to increase the temperature to the laser working temperature can be generated by combustion of oxidizer and fuel compatible with the laser generator, such as $NF_3$ and ethylene—a laser combustible burner. This laser compatible burner can replace the peroxide gas generator and its fuel supply system. The hot gases resulting from such a process can be injected directly to the cryogenic tank with no need of a heat exchanger. Within the tank, they supply the required energy and then flow mixed with the process gas—the helium or deuterium into the laser generator. In the same way, the fast heat exchanger can be replaced by a second compatible burner that injects gases to the process gases after they leave the storage tank and heats them to the required temperature directly.

A cryogenic storage tank according to an example of the invention has the following features. It comprises an inner tank that has a spherical shape and is made from stainless steel type 304L. Its diameter is 1 meter and wall thickness is ¾". It has two 500 mm long 3" diameter pipes welded on each side of its horizontal axis that are used as outlets and as supports to carry its load. This tank is enveloped by an external tank made of the same material with a wall thickness of ⅛" and welded to the internal tank supports at 400 mm from their internal ends. The space between the tanks is 50 mm wide and is sealed and kept at a vacuum of $10^{-5}$ torr. It contains 30 layers of MYLAR super insulation. The internal heat exchanger is made from copper tube 10 mm diameter, 0.1 mm thick, that enters the tank through one side and exits at the other side. Its overall length is 40 meters and it is divided into 6 parallel segments within the tank.

While embodiments of the invention have been described by way of illustration, it will be apparent that the invention can be carried out with many modifications, variations and adaptations, without departing from its spirit or exceeding the scope of the claims.

What is claimed is:

1. Method for the storage and delivery of process gases to laser generators, which comprises the following steps:
    a) cooling the process gas to a few degrees K, at the required work pressure, to reach a desired density;
    b) storing the cooled gas in a cryogenic environment at said work pressure;
    c) at the moment of use, gradually releasing the process gas from the cryogenic environment and concurrently heating it;
    d) controlling the process gas flow rate from the cryogenic environment so as to obtain the required work flow rate; and
    e) controlling the heat supplied to the released process gas so as to maintain it constantly at the required work pressure.

2. Method according to claim 1, wherein the desired density is in the order of hundreds of $kg/m^3$.

3. Method according to claim 2, wherein the desired density is about 200 $kg/m^3$.

4. Method according to claim 1, wherein the process gas is Helium and is cooled to about 4 K at 80 ata.

5. Method according to claim 1, wherein the process gas is heated by heat exchange with a heating gas.

6. Method according to claim 5, wherein the heating of the process gas takes place partly in the cryogenic environment and partly outside it.

7. Method according to claim 1, wherein the heating of the process gas is controlled synchronically with the flow rate of its release from the cryogenic environment to maintain the pressure substantially at its work value.

8. Method according to claim 1, wherein the heating of the process gas is controlled synchronically with the flow rate of its release from the cryogenic environment to maintain the temperature substantially at its work value.

9. Method according to claim 1, wherein the heating of the process gas is controlled synchronically with the flow rate of its release from the cryogenic environment to maintain both the pressure and the temperature substantially at their work values.

10. Method according to claim 1, wherein the process gas is chosen from among helium, ethylene, $NF_3$ and $D_2$.

11. Apparatus for the storage and delivery of process gases to laser generators, which comprises:
    I)—a cryogenic storage tank for storing process gas at cryogenic temperatures and at work pressure;
    II—means for feeding process gas to said tank at said temperature and pressure;
    III—conduit means for releasing said process gas from said tank and delivering it to the laser generator;
    IV—heating means for heating said process gas as it is released, whereby to control its flow rate, pressure and temperature as required for the operation of the laser generator; and
    V—a flow valve for controlling the timing and the flow of the process gas to the laser generator.

12. Apparatus according to claim 11, further comprising conduit, valves and control means.

13. Apparatus according to claim 11, further comprising a cryogenic refrigerator for keeping the stored gas at the desired cryogenic storage temperature.

14. Apparatus according to claim 11, comprising means for filling the cryogenic storage tank which are chosen from among: a) a high pressure refrigerator, b) means for carrying out a blow-down process from a pressurized process gas tank and through a cryogenic heat exchanger, c) means for prefilling the cryogenic storage tank with liquid process gas at low pressure, and d) a combination of at least two of the aforesaid means.

15. Apparatus according to claim 11, further comprising a valve to adjust the mass flow rate of the process gas by bleeding the same.

16. Method for the storage and delivery of process gases to laser generators, which comprises th following steps:
    a) cooling the process gas to a few degrees K, at the required work pressure, to reach a desired density;
    b) storing the cooled gas in a cryogenic environment at said work pressure;
    c) at the moment of use, gradually releasing the process gas from the cryogenic environment and concurrently heating it, wherein the process gas is heated by heat exchange with a heating gas, and wherein the heating gas is generated by the catalytic, exothermic decomposition of a solid or liquid substance;
    d) controlling the process gas flow rate from the cryogenic environment so as to obtain the required work flow rate; and
    e) controlling the heat supplied to the released process gas so as to maintain it constantly at the required work pressure.

17. Method according to claim 16, wherein the substance is hydrogen peroxide.

18. Method according to claim 16, wherein the heating gas is generated by the combustion of a gaseous fuel.

19. Method according to claim 18, wherein the oxidant for the combustion of the gaseous fuel is provided by the catalytic, exothermic decomposition of a solid or liquid substance.

20. Apparatus for the storage and delivery of process gases to laser generators, which comprises:
    I—a cryogenic storage tank for storing process gas at cryogenic temperatures and at work pressure;
    II—means for feeding process gas to said tank at said temperature and pressure;
    III—conduit means for releasing said process gas from said tank and delivering it to the laser generator;
    IV—heating means for heating said process gas as it is released, whereby to control its flow rate, pressure and temperature as required for the operation of the laser generator, wherein the heating means comprises:
    a heating gas generator apparatus;
    heat exchanger means, having low thermal mass, for causing fast heat transfer from said heating gas to the process gas as the latter is released from the cryogenic storage tank; and
    pressurizing means for applying to said heating gas substantially the same pressure as that of the process gas; and
    V—a flow valve for controlling the timing and the flow of the process gas to the laser generator.

21. Apparatus according to claim 20, wherein the heat exchanger means comprise:
    a) a first heat exchanger, comprising a conduit for causing the heating gas to flow through said cryogenic storage tank; and
    b) a second heat exchanger between said cryogenic storage tank and the laser generator.

22. Apparatus according to claim 20, wherein the heating gas generator apparatus comprises:
    a) a liquid oxidant supply vessel;
    b) a primary gas generator vessel comprising a catalyzer bed for generating a gaseous mixture from the decomposition of said liquid oxidant;
    c) a fuel supply;
    d) burners; and
    e) means for feeding said fuel and said gaseous mixture to the burners.

23. Apparatus according to claim 20, wherein the means for applying to the heating gas substantially the same pressure as that of the process gas comprise conduit and valve means for leading a part of the process gas to the liquid oxidant supply vessel.

24. Apparatus according to claim 22, further comprising a pump for compensating pressure losses, to deliver the liquid oxidant to the gas generator and maintain a pressure throughout the heating gas generator apparatus and the heat exchange means substantially equal to the work pressure of the process gas.

25. Apparatus according to claim 21, wherein the heat exchanger means comprise the cryogenic storage tank and a pipe system contained within it, immersed in the cryogenic gas.

26. Apparatus according to claim 22, wherein the second heat exchanger comprises a vessel through which the heating gas flows and which contains a pipe system through which flows the process gas issuing from the cryogenic storage tank.

27. Apparatus according to claim 20, comprising an outlet of the heating gas chosen from among a separate ejector or conduit means for conveying said gas to the main ejector as part of the primary stream thereof.

28. Apparatus according to claim 20, further comprising an auxiliary container for containing sufficient process gas for switching on and operating the laser until the process gas from the cryogenic storage tank becomes available at the appropriate temperature and pressure.

* * * * *